(12) United States Patent
Ross

(10) Patent No.: US 7,305,615 B2
(45) Date of Patent: Dec. 4, 2007

(54) METHODS AND APPARATUS FOR ACCELERATING DATA PARSING

(75) Inventor: Richard Ross, Berkeley, CA (US)

(73) Assignee: Gigalogix, Inc., Oakland, CA (US)

( * ) Notice: Subject to any disclaimer, the term of this patent is extended or adjusted under 35 U.S.C. 154(b) by 641 days.

(21) Appl. No.: 10/189,952

(22) Filed: Jul. 3, 2002

(65) Prior Publication Data
US 2003/0023633 A1   Jan. 30, 2003

Related U.S. Application Data

(60) Provisional application No. 60/308,996, filed on Jul. 30, 2001.

(51) Int. Cl.
G06N 3/00 (2006.01)

(52) U.S. Cl. .................... 715/513

(58) Field of Classification Search ........... 715/513, 715/517, 523, 530
See application file for complete search history.

(56) References Cited

U.S. PATENT DOCUMENTS

| | | | |
|---|---|---|---|
| 4,030,072 A * | 6/1977 | Bjornsson .................. 714/31 |
| 4,270,174 A * | 5/1981 | Karlin et al. ............... 701/115 |
| 5,519,628 A | 5/1996 | Russell et al. .............. 716/10 |
| 5,557,722 A | 9/1996 | DeRose et al. ............. 715/513 |
| 5,819,289 A | 10/1998 | Sanford, II et al. ......... 707/104.1 |
| 6,356,920 B1 | 3/2002 | Vandersluis ................ 715/501.1 |
| 6,523,036 B1 * | 2/2003 | Hickman et al. ............ 707/10 |
| 6,904,562 B1 * | 6/2005 | Hind et al. ................. 715/515 |
| 2002/0038320 A1 | 3/2002 | Brook |
| 2002/0073399 A1 * | 6/2002 | Golden ...................... 717/114 |
| 2002/0120561 A1 * | 8/2002 | Chin et al. .................. 705/38 |
| 2004/0205694 A1 * | 10/2004 | James et al. ................ 717/104 |
| 2004/0230660 A1 * | 11/2004 | Abjanic et al. ............. 709/207 |

OTHER PUBLICATIONS

Hors et al., "1. Document Object Model Core," Nov. 13, 2000, <http://www.w3c.org/TR/2000/REC-DOM-Level-2-core-20001113/core.html>, pp. 1-63.*
Tanenbaum, Andrew S., "Modern Operating Systems: Second Edition," Jan. 2001, Prentice Hall, pp. 143-144.*
XML: The Business-to-Business Solution for the Data Center, © by Intel 2001, pp. 2-7.
Steven Holzner, *Inside XML*, "Essential XML", chapter 1, pp. 1-50, © 2001.

* cited by examiner

*Primary Examiner*—Stephen Hong
*Assistant Examiner*—Kyle R Stork
(74) *Attorney, Agent, or Firm*—Michele Liu

(57) ABSTRACT

According to the present invention, methods and apparatus are provided for improving the efficiency of data parsing. Data parsing can be applied to a variety of different types of data in various computer systems and appliances. Some of the methods and apparatus provided include techniques for scanning, verifying, calculating hash values, copying, and white space handling.

18 Claims, 10 Drawing Sheets

METHODS AND APPARATUS FOR ACCELERATING DATA PARSING

CROSS-REFERENCE TO RELATED APPLICATIONS

This application claims priority under U.S.C. 119(e) from U.S. Provisional Application No. 60/308,996, entitled "Methods And Apparatus For Accelerating Data Parsing," as of filing on Jul. 30, 2001, the disclosure of which is herein incorporated by reference for all purposes.

BACKGROUND OF THE INVENTION

1. Field of the Invention

The present application relates to accelerating data parsing. More specifically, the present application relates to methods and apparatus for efficient hardware conversion of data into a machine accessible format.

2. Description of Related Art

Conventional software processes for parsing data such as Extensible Markup Language (XML) data have significant performance limitations. XML is described in the XML Specification 1.0 available from the World Wide Web Consortium, the entirety of which is incorporated by reference for all purposes.

XML provides several benefits over conventional HTML representations. XML allows a web client to acquire object information from two separate databases. XML provides techniques for more efficient balancing of load distribution between the web server and the web client. XML allows the presentation of the same data in different ways to different users. XML also provides mechanisms for tailoring information discovery to the needs of individuals. Because of a variety of XML benefits, XML has been growing in popularity. However, one of the constraints preventing the even more rapid adoption of XML is that XML parsing is extremely resource intensive. Software modules in conventional systems are provided to read XML data and provide access to their structure and content. The software modules may be part of an operating system or an application or may be a stand-alone utility. However, using the software modules to process XML data requires several times the amount of processing resources used to process many other types of data. Processing resources can be scarce particularly in systems such as handheld devices or web enabled mobile phones.

Consequently, it is desirable to provide methods and apparatus for improving the efficiency of XML data processing and parsing.

SUMMARY OF THE INVENTION

According to the present invention, methods and apparatus are provided for improving the efficiency of data parsing. Data parsing can be applied to a variety of different types of data in various computer systems and appliances. Some of the methods and apparatus provided include techniques for scanning, verifying, calculating hash values, copying, and white space handling.

In one embodiment, an integrated circuit for parsing data is provided. The integrated circuit includes memory, parsing circuitry and an interface. The parsing circuitry is configured to parse an element tag. Parsing an element tag comprises simultaneously performing white space handling while copying the element tag to a first preallocated block of memory. The element tag identifies element data. The interface allows for communication between the parsing circuitry and memory.

According to another embodiment, a data parsing accelerator for parsing data is provided. The accelerator includes memory, parsing circuitry, and an interface. A first block of memory is preallocated. The parsing circuitry is configured to parsing an element tag. Parsing an element tag comprises getting a character and calculating a state in parallel. The element tag identifies element data. The interface allows communication between the parsing circuitry and memory.

According to another embodiment, a method for parsing XML data is provided. The method includes: (a) preallocating a first block of memory; (b) performing white space handling on the XML data; (c) copying the XML data to memory; and (d) calculating a hash value corresponding to the XML data. At least two of the above steps b-d are performed simultaneously.

According to other embodiments, parsing circuitry coupled to a memory is provided. The parsing circuitry includes: white space handling subcircuitry configured to remove white space in an XML data string; hash calculation subcircuitry configured to calculate a hash value associated with the XML data string; and duplication subcircuitry configured to copy the XML data string to permanent memory. The white space handling subcircuitry, hash calculation subcircuitry, and duplication subcircuitry all operate on a character in the XML data string in the same clock cycle.

A further understanding of the nature and advantages of the present invention may be realized by reference to the remaining portions of the specification and the drawings.

BRIEF DESCRIPTION OF THE DRAWINGS

The invention may best be understood by reference to the following description taken in conjunction with the accompanying drawings, which are illustrative of specific embodiments of the present invention.

DETAILED DESCRIPTION OF SPECIFIC EMBODIMENTS

Reference will now be made in detail to some specific embodiments of the invention including the best modes contemplated by the inventors for carrying out the invention.

Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. Well known process operations have not been described in detail in order not to unnecessarily obscure the present invention.

According to various embodiments, the present invention can be used to accelerate XML processing in one of a variety of processor based systems such as servers, routers, handheld devices, mobile phones, and personal computers.

Figure 1:
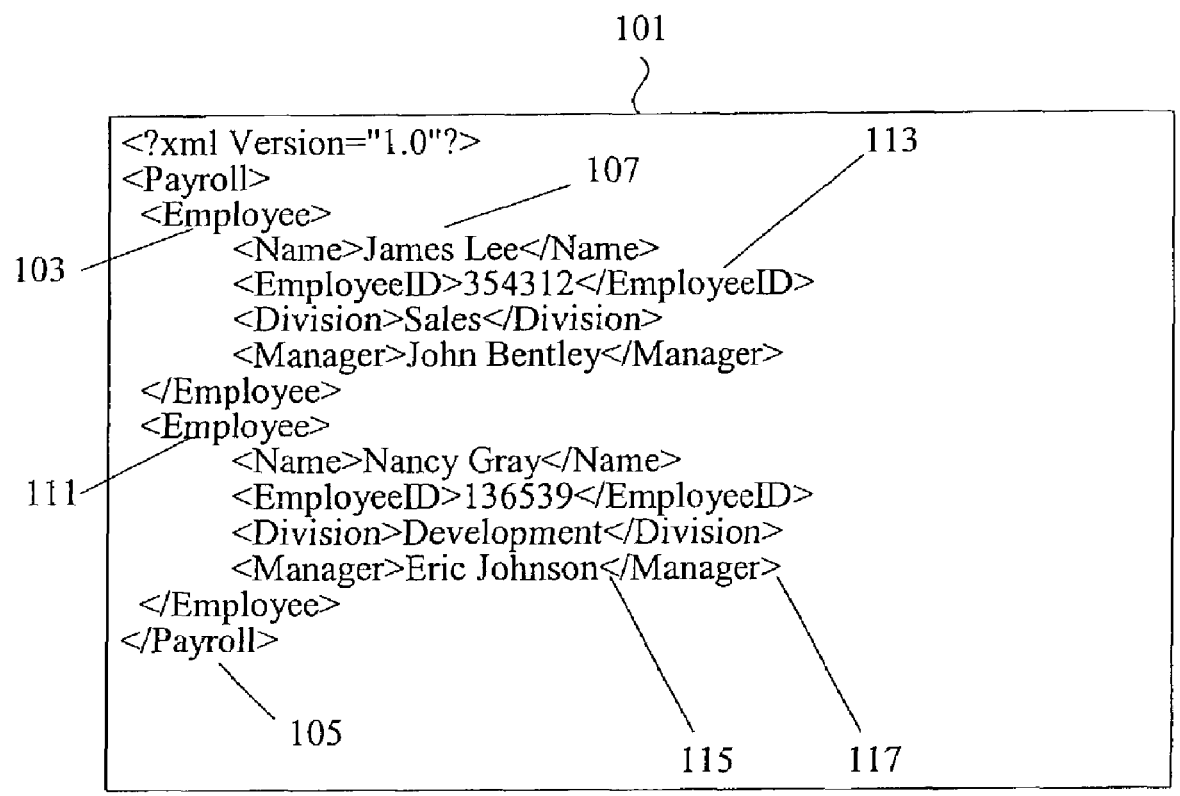
FIG. 1 is a diagrammatic representation showing data that can be parsed using the mechanisms and techniques of the present invention.

FIG. 1 is a diagrammatic representation showing one example of data that can be parsed using the techniques of the present invention. Techniques for converting data expressions into computer readable elements based on labels describing the structure of the data expressions are referred to herein as parsing techniques. Labels describing the structure of data expressions are referred to herein as tags. Parsers are useful in applications such as the extraction of data from XML files and the techniques of the present invention will be described with reference to XML. However, it will be appreciated by one skilled in the art that the techniques of the present invention can be applied to markup languages (e.g. XML, HTML, SGML, XHTML), programming languages (e.g. C++, LISP, Java), file formats (e.g. RTF, Postscript), database languages (e.g. SQL), protocols (e.g. HTTP, FTP), natural languages such as English and Japanese, mathematical expressions, etc.

XML data 101 includes tags 103 and 111, element data or element values 107, end tags 113 and 105 as well as delimiters 115 and 117. Any indicator used to show when an element begins or ends is referred to herein as a delimiter. Some examples of delimiters include characters such as slashes, commas, and various types of brackets and parentheses.

Figure 2:
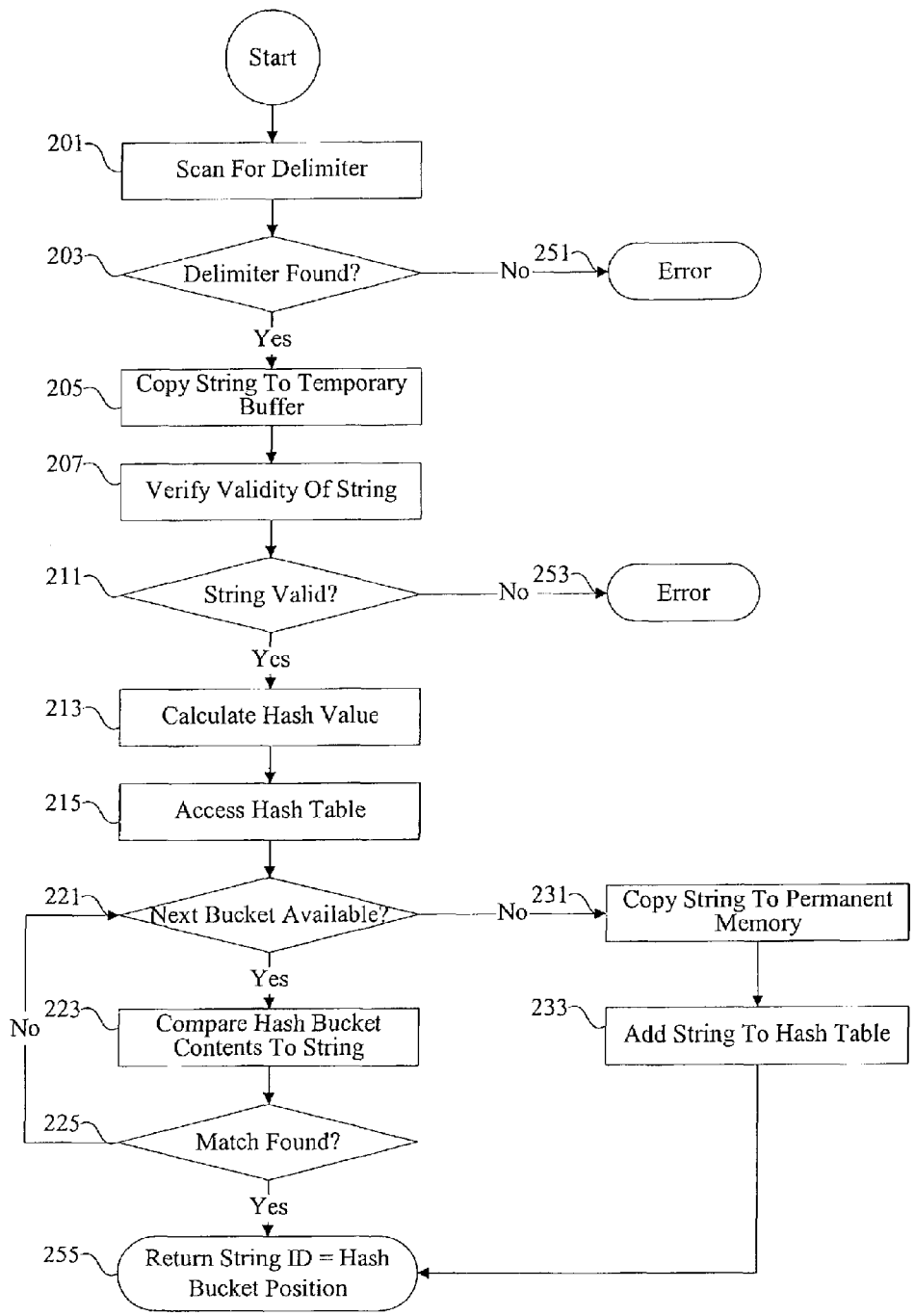
FIG. 2 is a flow process diagram showing parsing of an element tag.

FIG. 2 is a process flow diagram depicting one particular technique for parsing element tags such as element tags 103 and 111. At 201, a scan is conducted for delimiters. In one example, scanning for a delimiter is performed using the following code:

```
for (i=0; i<count; i++)
   if (input[i+offset]==delimiter)
      break;
len =i;
```

As noted above, a delimiter is often used to indicate where a subsection of data begins or ends. At 203, if a delimiter is not found, an error is returned at 251. If a delimiter is found, the associated string is copied to a temporary buffer at 205. The validity of the string is then verified at 207. According to various embodiments, verifying the validity of the string includes checking for invalid characters. Copying the string to a temporary buffer and verifying the validity of the string can be done using the following code or equivalent mechanisms:

```
for (i=0; i<len; i++)
   tempBuf[i]=input[i+offset];
for (i=0; i<len; i++)
   if (!(IS_NAME_CHAR(tempBuf[i])))
      error( );
```

If the string is not valid at 211, an error is returned at 253. If the string is valid, a hash value is calculated at 213. A hash function can be used to store and access individual strings stored in a hash table. In one embodiment, each hash value corresponds to only one or two buckets. In one particular example, each tag is located in one of a few buckets associated with the hash value derived by applying the hash function to the tag. In one example, calculating the hash value is performed by applying the following sequence:

```
for (i=0; i<len; i++)
   hashVal=F(hashVal,tempBuf[i]);
```

The hash table is then accessed at 215. If no buckets correspond to the entry accessed with the hash value, the string is copied to permanent memory at 231 and added to the hash table at 233. Copying the string to permanent memory can be performed with the following code:

```
for (i=0; i<len; i++)
   newHashedString[i]=tempBuf[i];
```

If a next bucket is available at 221, the contents of the hash bucket are compared to the string at 223. Comparing the string can be done using the following sequence:

```
for (i=0; i<len; i++)
   if (hashedString[i] !=tempBuf[i])
      break;
```

If the string matches the contents at 225, the string ID equivalent to the hash bucket position is returned at 255. If the string does not match the contents, it is determined if a next bucket is available at 221.

It should be noted that conventional techniques for parsing data require accessing the same data several times. In one example, a tag must be scanned first to find a delimiter so that the length of the tag is determined. Scanning for a delimiter entails a loop such as "for" loops described with reference to process 201. After a length is determined, the tag is copied and the validity of the tag is verified. Verifying and copying entail accessing the same data again. Multiple loops are required in conventional implementations. Copying the data from input buffers to temporary buffers to permanent buffers entails additional accesses and inefficiency.

Figure 3:
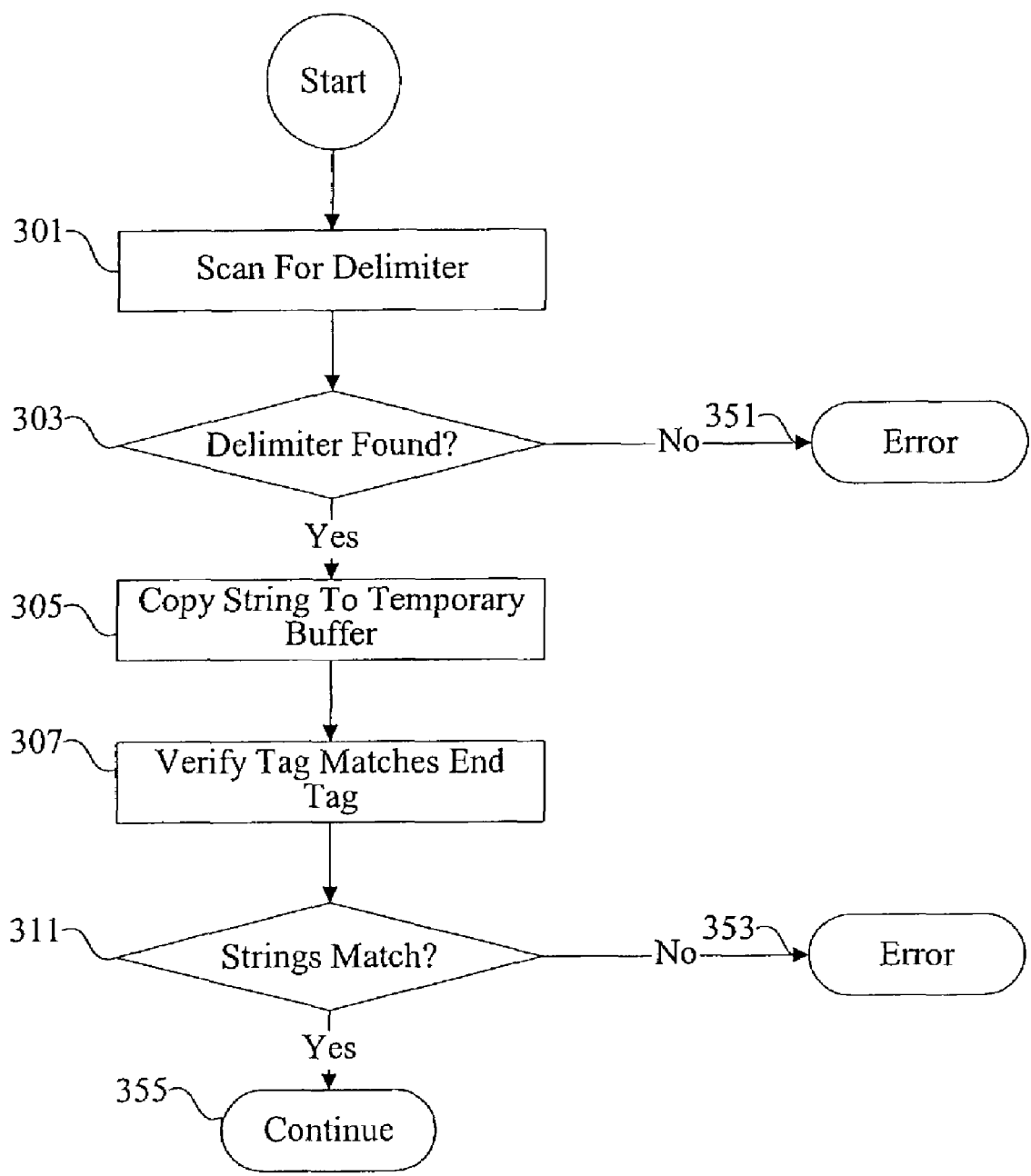
FIG. 3 is a flow process diagram depicting parsing of an element end tag.

Accessing the same data several times is an inefficient way of parsing tags. The same problems occur when parsing end tags and parsing data values. FIG. 3 is a process flow diagram showing one example of a technique for parsing an end tag. A scan for a delimiter is conducted at 301. Scanning can be performed using the following loop:

```
for (i=0; i<count; i++)
   if (input[i+offset]==delimiter)
      break;
len=i;
```

If a delimiter is not found at 303, an error is returned at 351. If a delimiter is found, the associated string is copied to a temporary buffer at 305. In one embodiment, the string is an end tag and the end tag is verified to ensure that it matches the beginning tag at 307. If the strings do not match at 311, an error is returned at 353. Copying the string to a temporary buffer and verifying the validity of a string can be done using the following code:

```
for (i=0; i<len; i++)
   tempBuf[i]=input[i+offset];
for (i=0; i<len; i++)
   if (hashedString[i]!=tempBuf[i])
      break;
```

Figure 4:
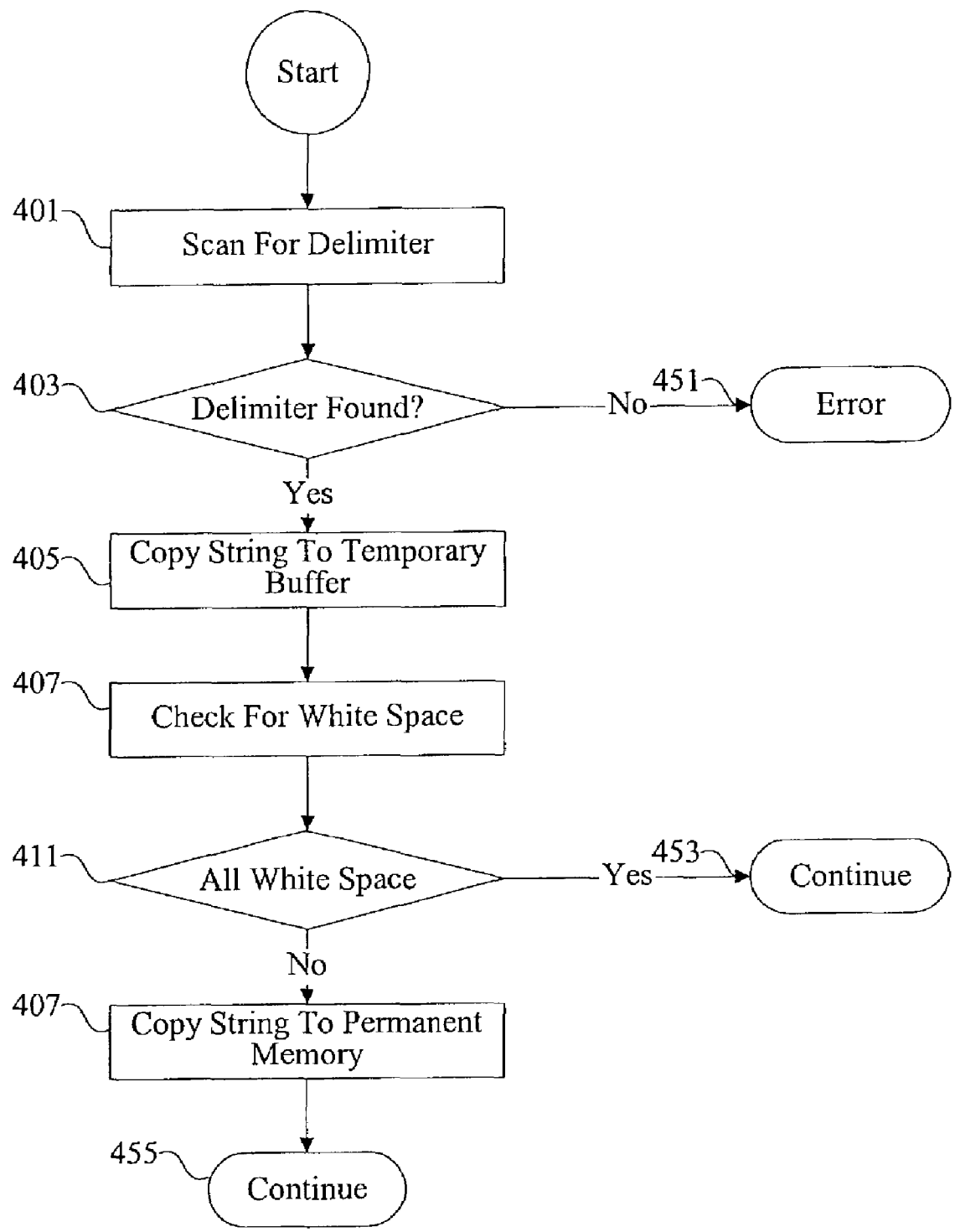
FIG. 4 is a flow process diagram showing parsing of element data.

FIG. 4 is a process flow diagram showing parsing of an element value according to a specific embodiment of the present invention. Any type of data character and noncharacter data are herein referred to as data or element values. In one example, XML element values are located in between a tag and the corresponding end tag. At 401, a scan for a delimiter is conducted. Scanning can be performed using the following loop:

```
for (i=0; i<count; i++)
    if (input[i+offset]==delimiter)
        break;
len=i;
```

If a delimiter is not found at 403, an error is returned at 451. If a delimiter is found, the associated string is copied to a temporary buffer at 405. White space is checked for at 407. Characters visually represented as blank space on a display are herein referred to as white space characters. White space characters include spaces, tabs, carriage returns, etc. Copying the string to a temporary buffer and checking for white space can be performed using the following sequence:

```
for (i=0; i<len; i++)
    tempBuf[i]=input[i+offset];
for (i=0; i<len; i++)
    if (!IS_WHITE_SPACE(tempBuf[i]))
        break;
```

If the string is all white space, no operations are necessary and control is returned at 453. If the string is not all white space, the string is copied to permanent memory at 407 using code such as the following:

```
for (i=0; i<len; i++)
    elementValue[i]=tempBuf[i];
```

It should be noted that although code is used throughout the present application to clarify the invention, a variety of different mechanisms such as microcode and hardwiring can be used to provide the techniques of the present invention. In one embodiment, code written in a general purpose programming language such as C or C++ is converted into a hardware descriptor language (HDL) file using a tool such as the DK1 Design Suite available from Celoxica Corporation of Abingdon, United Kingdom. The HDL file can then be synthesized and implemented on a programmable chip such as a programmable logic device (PLD) or a field programmable gate array (FPGA). Some available synthesis tools are Leonardo Spectrum, available from Mentor Graphics Corporation of Wilsonville, Oreg. and Synplify available from Synplicity Corporation of Sunnyvale, Calif.

As noted above, accessing the same data multiple times is one of the reasons why conventional parsers are inefficient. The techniques of the present invention increase the efficiency of XML parsing by implementing the techniques on an XML accelerator. It should be noted that the XML accelerators designed according to the techniques of the present invention can be configured to run exactly the same inefficient process that many software XML parsers run. However, the specific embodiments of the present invention provide an optimized process configured specifically for hardware that recognizes the unique properties of XML data. The hardware optimized process provides benefits over conventional software XML parsing processes. In one example, memory is preallocated for parsing XML tags. The XML accelerator can then scan, verify, copy, and index all in parallel. Conventional software implementation can not perform scanning, verifying, copying, and indexing in parallel because of the need for intermediate buffers and the availability of limited compiler technology.

Figure 5:
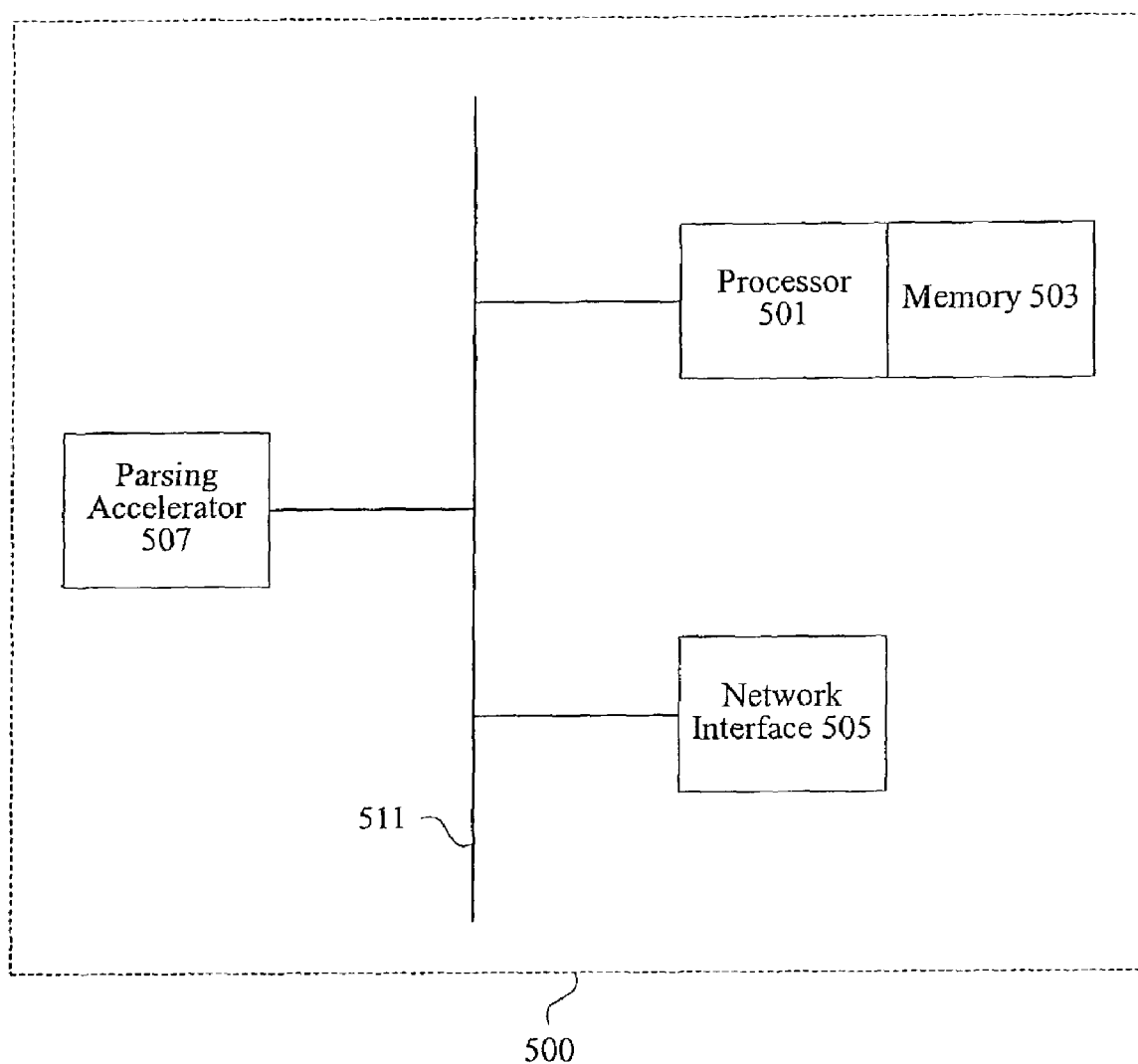
FIG. 5 is a diagrammatic representation depicting a system that can use the techniques of the present invention.

FIG. 5 is a diagrammatic representation of one example of a processing system 500 having a parsing accelerator designed in accordance with an embodiment of the invention. As shown in FIG. 5, the techniques of the present invention may be implemented in a parsing accelerator 507 connected to a external processor 501 through a bus 511. A processor not implemented on a parsing accelerator chip is referred to herein as an external processor. The parsing accelerator 507 can be a programmable logic device (PLD), field programmable gate array (FPGA), an application specific integrated circuit (ASIC), or another device coupled to the external processor 501. According to specific embodiments, the parsing accelerator 507 is implemented either on a card connected to the bus 511 or as a standalone chip integrated in the system 500.

The external processor 501 is coupled to system memory 503. Although the external processor 501 may be the central processing unit or CPU of a system 500, it does not necessarily have to be the CPU. It can be one of a variety of processors. A network interface 505 couples the processing system 500 to networks such as local area and wide area networks (not shown). The network interface manages inbound and out-bound messages such as IP packets, allowing the system 500 to provide accelerated parsing of data contained in the messages. A variety of configurations will be appreciated by one of skill in the art. In one embodiment, the XML accelerator instruction set is integrated into the processing core of a CPU, such as that available from Tensilica Corporation of Santa Clara, Calif. or ARC Cores of San Jose, Calif. In another embodiment, techniques of the present invention are integrated into a CPU such as the CPUs available from Intel Corporation of San Jose, Calif. or AMD Corporation of Sunnyvale, Calif. By implementing parsing accelerator functionality implemented entirely on the external processor, a separate card or chip in the system 500 is not needed.

According to various embodiments of the present invention, a parsing accelerator 507 performs many functions including XML tag and end tag parsing, as well as XML element value parsing. In one embodiment, the XML accelerator integrated with the microprocessor core performs XML parsing in order to reduce the software XML parsing performed by the associated processor. In one example, the XML accelerator chip converts data into machine-accessible format significantly faster (e.g. an order of magnitude faster) than conventional software modules. According to various embodiments, the XML accelerator runs an optimized parsing algorithm specifically configured for hardware implementations to process XML data at over 30 MB/sec at a clock speed of over 300 MHz. The XML accelerator can also be configured to handle queries and transforms.

Figure 6:
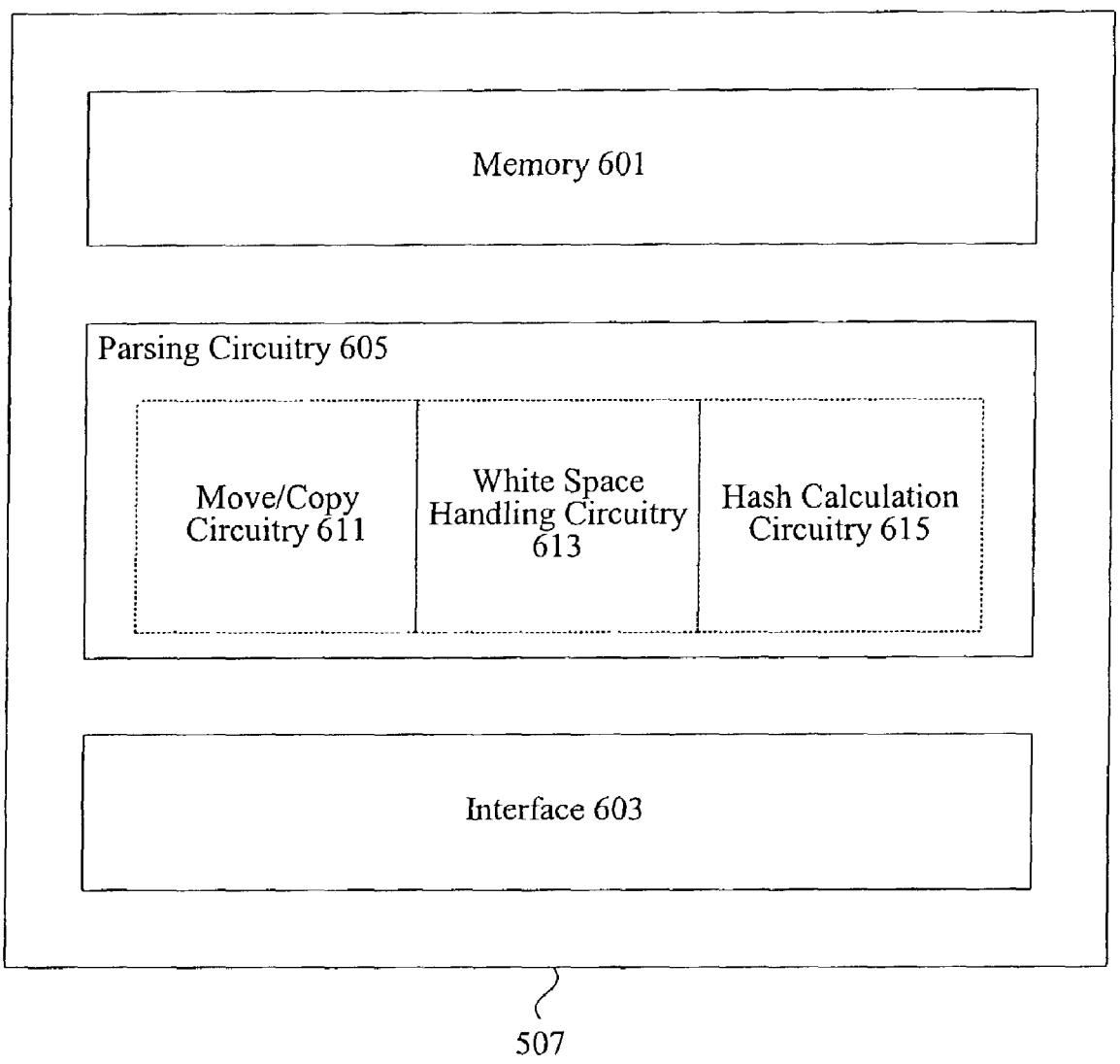
FIG. 6 is a diagrammatic representation showing one example of a data parsing accelerator.

FIG. 6 is a diagrammatic representation of a specific implementation of a parsing accelerator 507. In one embodiment, the parsing accelerator 507 includes parsing circuitry 605, memory 601, and an interface 603. According to various embodiments, the interface 603 reads data from an external processor that passes the data to parsing circuitry 605. The data processed by parsing circuitry 605 is sent to an entity such as an external processor through interface 603. Memory 601 is coupled to parsing circuitry 605 which includes separate component blocks for white space handling circuitry 613, hash calculation circuitry 615, and copy/compare or duplication circuitry 611. It should be noted that component blocks 611, 613, and 615 may be entirely separate components or may share various circuit elements.

Figure 7:
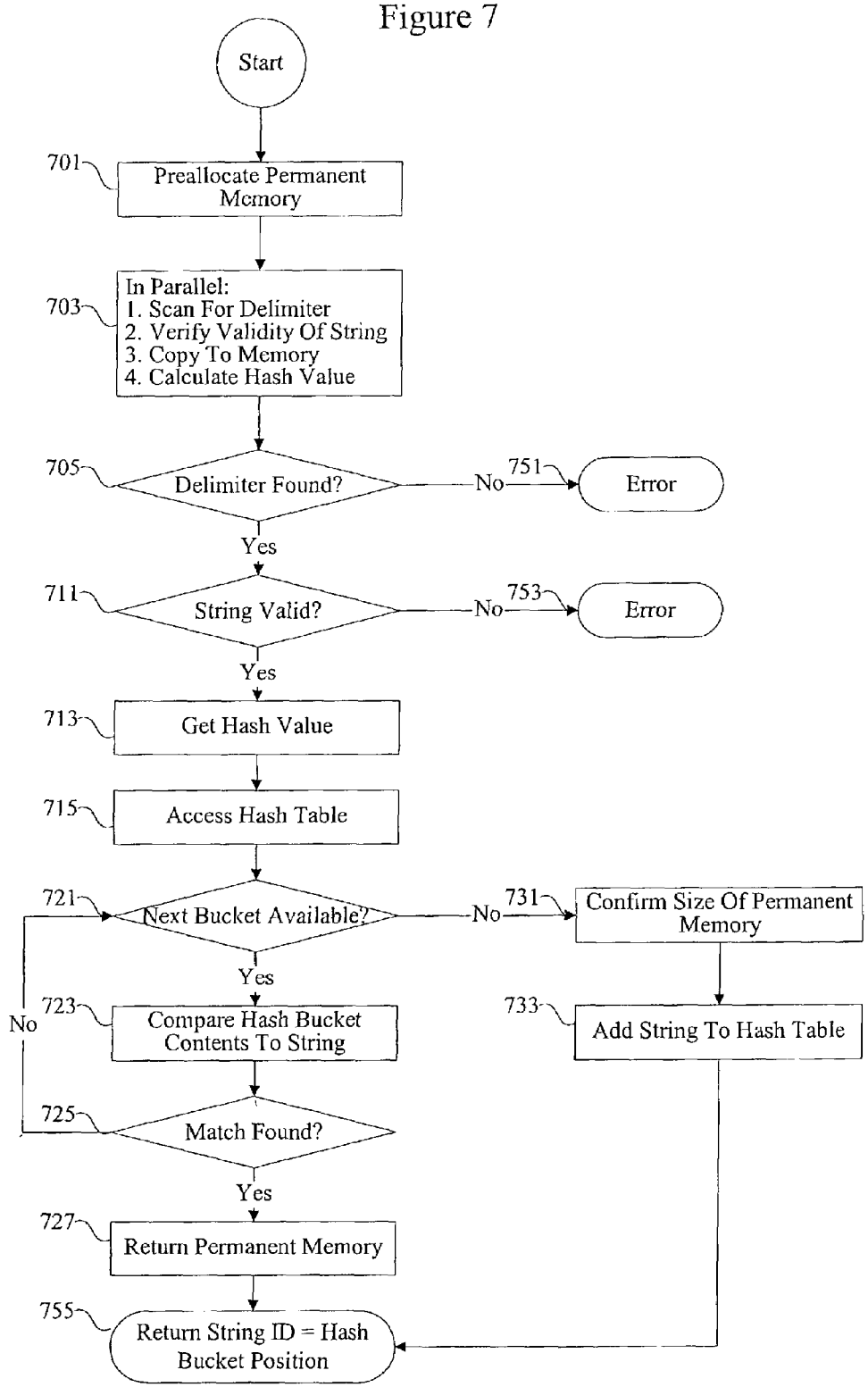
FIG. 7 is a flow process diagram showing another technique for parsing of an element tag.

FIG. 7 is a flow process diagram showing a technique for tag parsing, according to various embodiments. At 701, permanent memory is preallocated. Allocating memory before data is scanned is referred to herein as preallocating memory. Memory that maintains data values even after an associated function terminates is referred to herein as permanent memory. By preallocating permanent memory at

701, data can immediately be copied to permanent memory instead of to a temporary buffer. The amount of memory preallocated memory can be based on factors such as the amount of available memory, the file size, or the expected length of the data. In one embodiment, the amount of memory preallocated is a multiple of the file size.

At 703, a scan for a delimiter is conducted while the validity of the string being scanned is verified. According to various embodiments, scanning for a delimiter can comprise scanning for multiple delimiters and calculating states. In one embodiment, finding a delimiter leads to a possible change in state. Scanning can include getting a character, determining the type of the character, and calculating the state while implicitly verifying the validity of the character. Finding another delimiter leads to another change in state. According to various embodiments, the string is also copied to permanent memory and the hash value is calculated as the scan is being conducted. Conducting multiple operations with a single access to a particular data value is referred to herein as conducting the operations concurrently, simultaneously or in parallel. According to various embodiments, concurrent or simultaneous operations occur on a character in a single clock cycle. Concurrent or simultaneous operations on a sequence of characters occur in the same clock cycles. Here at 703, characters in a string are scanned. While each character is being accessed, it is determined whether the character is a delimiter, whether the character can be part of a valid string, at the same time the character is copied to permanent memory and the character is input into a hash function.

White space handling can also occur at this time. Techniques for checking and/or converting one or more white space characters is referred to herein as white space handling. White space handling can include checking for white spaces and converting line feed and carriage return characters. Some languages including XML require that line feed characters followed by a carriage return be converted into carriage returns, standalone line feed characters be converted into carriage returns, and carriage return characters remain carriage return characters. Although the line feed carriage return conversion may seem relatively simple, performing such conversions is resource intensive as a test for the conversion is typically applied to every character. According to various embodiments, techniques are implemented in hardware in order to allow concurrent or parallel operations to improve processing and parsing efficiency. One technique for scanning in parallel is shown as follows:

```
for (i=0; i<count; i++)
    if (!FCN(input[i+offset], &permMem[i], delimiter)
        break;
len=i;
```

Line feed, carriage return, and white space handling are key bottlenecks in handling XML data. In the names within XML tags, white space chars are delimiters and so are not part of the name itself. The white space characters can still be in the tag, e.g. within the value of an attribute which is just like data. Performing specific XML parsing steps in parallel allows a level of efficiency XML parsing in hardware configurations that nonoptimized configurations can not provide in conventional systems.

Large primitives typically decrease the clock speed as gate path increases (e.g., on an ASIC), so simplifying primitives by breaking up the primitive into smaller parts often increases overall integrated circuit performance since clock speed can increase as the gate path decreases. According to various embodiments, primitive operations noted above may include hash calculations, table lookup, white space handling, etc. However, in other embodiments, a primitive operation of the present invention includes white space handling, but does not include other operations relating to hash calculations or table lookup. The techniques of the present invention recognize that line feed, carriage return, and white space handling are key bottlenecks in handling XML data. In one example, a single assembler/primitive operation (MAGIC_WS_OP(C)) is configured to perform only white space handling. The single assembler/primitive operation provides significant time savings over larger primitive operations. The other operations could be performed using other primitives. The white space handling primitive operation could be used as follows:

```
loop:
    pop in next char C
    (C, flags)=MAGIC_WS_OP(C); //magic op outputs 0
        to skip next pop out
    if flags=0 goto @1:
    pop out C
    @1:
    DBRA len, loop//decr len, and loop if more left
```

According to various embodiments, if no delimiters are found at 705 or if a bad character is found at 711, the XML accelerator exits with an error. It should be noted that permanent memory can be returned at this point. Otherwise, a hash value is acquired at 713. At 715, the parsing circuitry then attempts to access a bucket in the hash table. At 721, it is determined if a next bucket is available. If no next bucket is available, the string is not currently in the hash table and the string is added by confirming the size of permanent memory at 731 and adding the string to the hash table at 733. If the hash bucket contents are compared to the string at 723 and the contents do not match, the next bucket is checked at 721. At 725, if the hash bucket contents match the string, permanent memory is returned at 727 and the string ID equivalent to the hash bucket position is returned at 755.

It will be appreciated by one of skill in the art that alternative data structures can be used for maintaining tags and other XML data. Various data structures such as linked lists and arrays implemented in hardware can also be used to store XML data.

Figure 8:
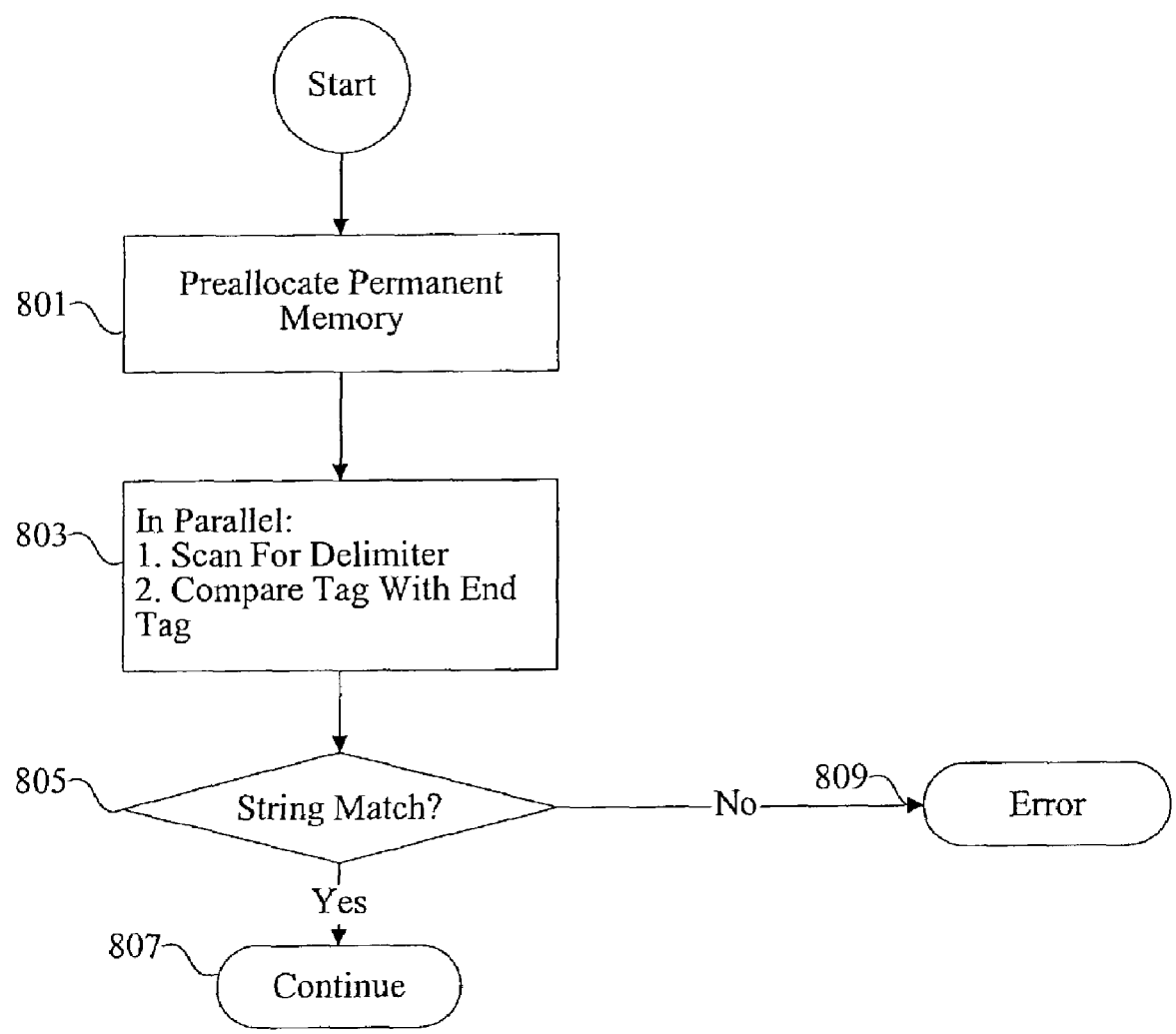
FIG. 8 is a flow process diagram depicting another technique for parsing of an element end tag.

FIG. 8 is a flow process diagram showing one example of a technique for end tag parsing. At 801, permanent memory is preallocated. By preallocating permanent memory at 801, no temporary buffer is needed. In one embodiment, a scan for a delimiter is conducted and each character of an end tag is compared to a character in the beginning tag at 803. Scanning for a delimiter while comparing tags with end tags can be conducted using the following code:

```
for (i=0; i<count; i++)
    if (!FCN2(input[i+offset], beginTagString[i], delimiter)
        break;
len=i;
```

Characters can include ASCII or Unicode characters. If the strings do not match at 805, an error is returned at 809. Otherwise, the parsing techniques can continue at 807.

Figure 9:
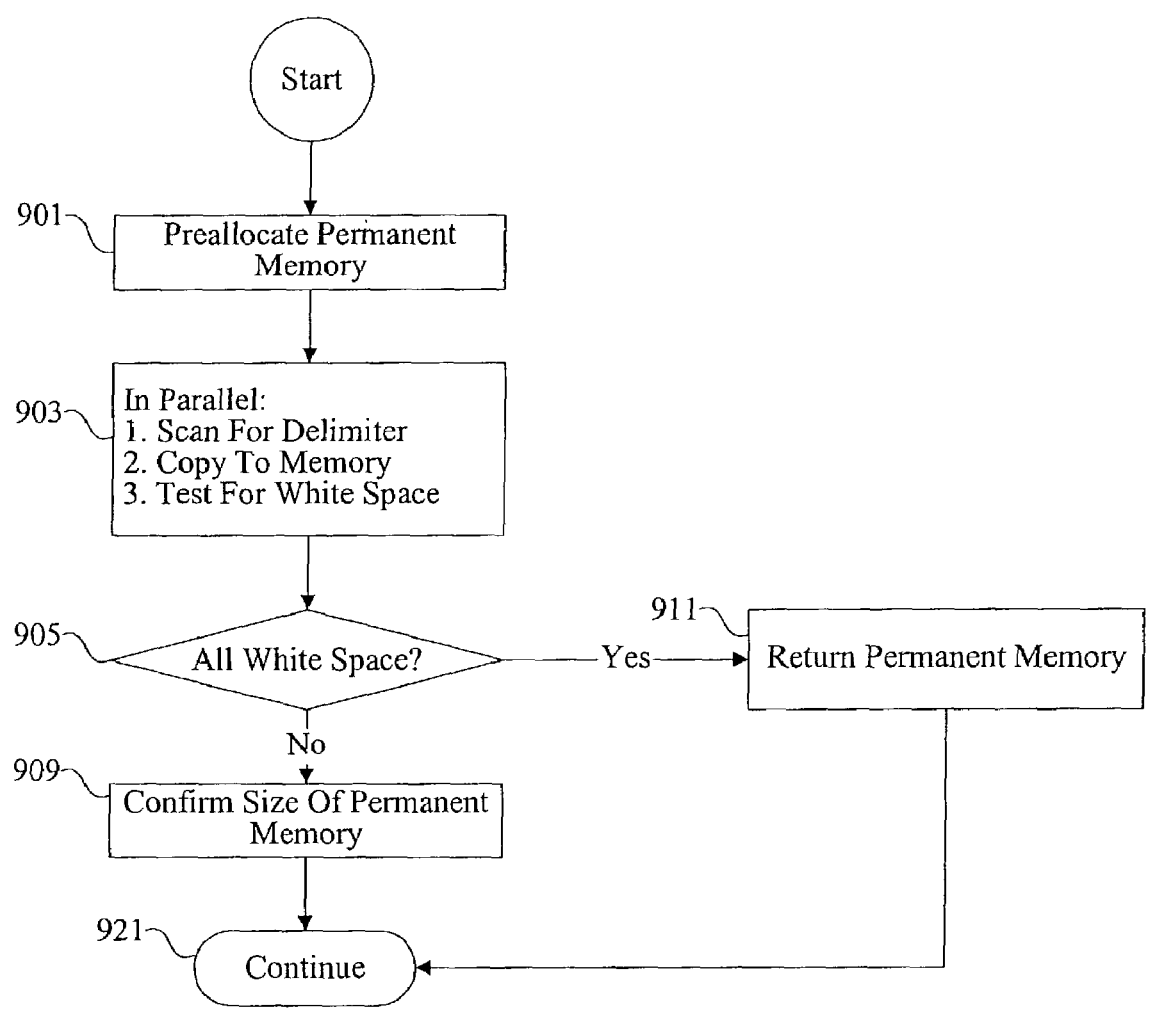
FIG. 9 is a flow process diagram showing another technique for parsing of element data.

FIG. 9 is a process flow diagram showing a technique for element value parsing which may be employed with the present invention. At 901, memory is preallocated. Permanent memory can be preallocated based on the expected length of data or the expected length of the element value. The element value parsing circuitry then performs in parallel a scan for a delimiter, a copy to permanent memory, and a test for non-white characters at 903.

Scanning for a delimiter while copying a string to memory and testing for white space can be performed using the following code:

```
for (i=0; i<count; i++)
    if (!FCN3(input[i+offset], &permMem[i], delimiter)
        break;
len=i;
```

If all the characters are white space at 905, no values need to be copied to permanent memory and permanent memory is returned at 911. If the characters are not all white space, the size of permanent memory is confirmed at 909 and the process returns at 921. In another example for parsing element values, no test for white space is conducted and the only concurrent operations are a scan for a delimiter and a copy to permanent memory. In another example, in a process for parsing element tags, the validity of a tag is not verified and the only concurrent operations are scanning for a delimiter and copying the tag to permanent memory. A hash value may not need to be calculated.

Figure 10:
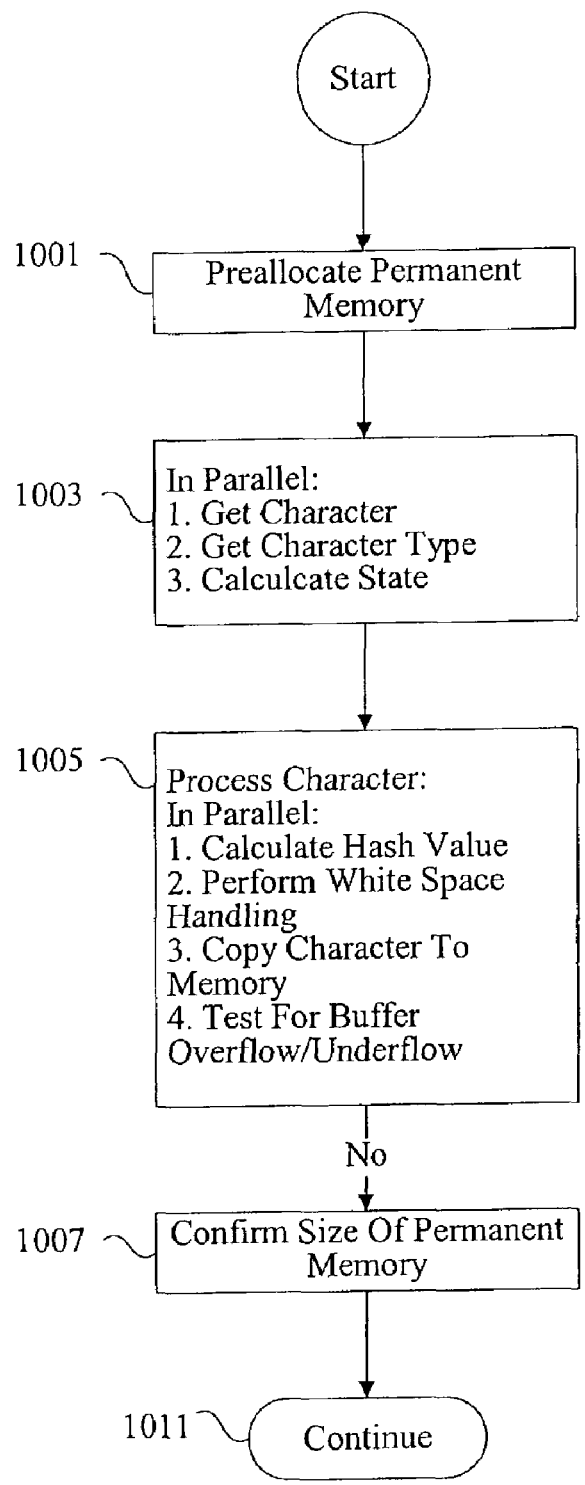
FIG. 10 is a flow process diagram showing another technique for parsing data.

It should be noted that many alternative techniques are possible within the scope of the present invention. One example of an alternative embodiment is shown in FIG. 10. At 1001, memory is preallocated. At 1003, the next character is obtained while simultaneously getting the type of the character and calculating the state. By calculating the state, a test for validity is implicitly included, as an invalid character would not match a valid character in a state. After the character is obtained at 1003, the character can then be processed based on the state. The state provides information on how to process the character. In one embodiment, processing at 1005 includes the following steps performed simultaneously: calculating a hash value, performing white space handling, copying the character to memory, and testing for buffer overflow or underflow. It should be noted that steps described as being performed in parallel do not all necessarily have to be performed in parallel or performed at all. In one example, state information may instruct that only calculating a hash value and performing white space handling be performed in parallel. The other steps may not be needed. It should also be noted that any steps not performed simultaneously also do not need to be performed in any particular sequence. At 1007, the size of permanent memory is confirmed and the process continues at 1011.

While the invention has been particularly shown and described with reference to specific embodiments thereof, it will be understood by those skilled in the art that changes in the form and details of the disclosed embodiments may be made without departing from the spirit or scope of the invention. For example, embodiments of the present invention may be used to parse a variety of different types of data. Therefore, the scope of the invention should be determined with reference to the appended claims.

What is claimed is:

1. XML accelerator parsing circuitry connected to a memory, the XML accelerator parsing circuitry comprising:
    white space handling subcircuitry configured to remove white space in an XML data string provided to the XML accelerator parsing circuitry;
    hash calculation subcircuitry configured to calculate a hash value associated with the XML data string; and
    duplication subcircuitry configured to copy the XML data string to permanent memory;
    wherein the XML data string is simultaneously input to the white space handling subcircuitry, the hash calculation subcircuitry, and the duplication subcircuitry with a single access to each character in the XML data string,
    wherein the white space handling subcircuitry, the hash calculation subcircuitry, and the duplication subcircuitry simultaneously operate on a character in the XML data string.

2. An integrated circuit for parsing Extensible Markup Language (XML) data, the integrated circuit comprising:
    memory;
    parsing circuitry configured to parse an element tag provided to the integrated circuit, wherein the parsing circuitry scans for characters associated with the element tag,
    wherein each of the characters is simultaneously input into a first component, a second component, and a third component of the parsing circuitry with a single access to the character,
    wherein the first component calculates a hash value for the input character, the second component copies the input character to a first preallocated block of memory, and the third component performs white space handling for the input character,
    wherein the first, second, and third components simultaneously perform the hash value calculation, the copying, and the white space handling while the scan of the characters occurs; and
    an interface for allowing communication between the parsing circuitry and memory.

3. The integrated circuit of claim 2, wherein the scans for the characters comprise getting the characters, determining the character type, and calculating a state with a single access to each character.

4. The integrated circuit of claim 2, wherein the parsing circuitry is configured to perform white space handling using a single primitive operation.

5. The integrated circuit of claim 2, wherein the parsing circuitry is further configured to determine whether a bucket associated with the hash value contains an entry corresponding to an XML element tag.

6. The integrated circuit of claim 5, wherein an entry corresponding to the XML element tag is added if it is determined that no bucket associated with the hash value contains an entry corresponding to the XML element tag.

7. The integrated circuit of claim 6, wherein the length of the first preallocated block of memory is set to correspond to the length of the XML element tag after the XML element tag is copied to the first preallocated block of memory.

8. The integrated circuit of claim 5, returning the first preallocated block of memory if a bucket associated with the hash value contains an entry corresponding to the XML element tag.

9. The integrated circuit of claim 5, returning a hash bucket identifier associated with the hash bucket containing the entry corresponding to the XML element tag.

10. The integrated circuit of claim 2, wherein performing white space handling comprises converting a line feed character followed by a carriage return character into a carriage return character.

11. The integrated circuit of claim 10, wherein performing white space handling further comprises converting a line feed character not followed by a carriage return into a carriage return character.

12. The integrated circuit of claim 2, wherein the integrated circuit is a data parsing accelerator.

13. The integrated circuit of claim 2, wherein the integrated circuit is a processor.

14. A computer system, comprising the integrated circuit of claim 2.

15. A server, comprising the integrated circuit of claim 2.

16. A network appliance, comprising the integrated circuit of claim 2.

17. An accelerator card, comprising the integrated circuit of claim 2.

18. A handheld device, comprising the integrated circuit of claim 2.

* * * * *

UNITED STATES PATENT AND TRADEMARK OFFICE
CERTIFICATE OF CORRECTION

| | | |
|---|---|---|
| PATENT NO. | : 7,305,615 B2 | Page 1 of 1 |
| APPLICATION NO. | : 10/189952 | |
| DATED | : December 4, 2007 | |
| INVENTOR(S) | : Richard Ross | |

It is certified that error appears in the above-identified patent and that said Letters Patent is hereby corrected as shown below:

Column 10, line 38, cancel the text beginning with "6. The integrated circuit" and ending with "XML element tag" in column 10, line 41, and insert the following claim:

--6. The integrated circuit of claim 5, wherein an entry corresponding to the XML element tag is added if it is determined that no bucket associated with the hash value contains an entry corresponding to the XML element tag.--

Signed and Sealed this

Twenty Second Day of April, 2008

JON W. DUDAS
*Director of the United States Patent and Trademark Office*